103-85
2/28/78

AU 115 EX
XR 4,076,545

United States Patent [19]
Azuma et al.

[11] 4,076,545
[45] Feb. 28, 1978

[54] PROCESS OF PRODUCING CALCIUM ALUMINATE MONOSULFATE HYDRATE

[75] Inventors: Tomisaburo Azuma; Kazuto Ichimaru; Kouichi Tateno; Takeru Murakami, all of Kadoma, Japan

[73] Assignee: Matsushita Electric Works, Ltd., Kadoma, Japan

[21] Appl. No.: 632,596

[22] Filed: Nov. 17, 1975

[30] Foreign Application Priority Data

Nov. 15, 1974   Japan .................................. 49-132187

[51] Int. Cl.$^2$ ............................................ C01B 17/96
[52] U.S. Cl. ........................................ 423/544; 106/85;
106/104; 106/315; 423/555; 423/556; 423/625; 423/636
[58] Field of Search ...................... 106/85, 90, 99, 104, 106/315, 89; 423/128, 166, 544, 556, 625, 636, 555

[56] References Cited

U.S. PATENT DOCUMENTS

| | | | |
|---|---|---|---|
| 2,198,800 | 4/1940 | Badollet | 106/90 |
| 2,313,107 | 3/1943 | Wertz | 106/90 |
| 3,552,357 | 1/1971 | Quayle et al. | 106/99 |
| 3,758,319 | 9/1973 | Ergene | 106/99 |
| 3,775,143 | 11/1973 | Mikhailoo et al. | 106/104 |
| 3,834,916 | 9/1974 | Kesler | 106/99 |
| 3,861,929 | 1/1975 | Deets et al. | 106/104 |

*Primary Examiner*—Patrick P. Garvin
*Assistant Examiner*—John P. Sheehan
*Attorney, Agent, or Firm*—Sughrue, Rothwell, Mion, Zinn and Macpeak

[57] ABSTRACT

A process of producing calcium aluminate monosulfate hydrate by reacting a mixture of a lime component, an alumina component, a calcium sulfate component, and water at a temperature of from about 100° C. to about 200° C.

By the process of this invention, the aimed product having a high purity is obtained at a high yield without need of high temperature for the reaction. The product obtained is useful as building materials.

11 Claims, 2 Drawing Figures

PROCESS OF PRODUCING CALCIUM ALUMINATE MONOSULFATE HYDRATE

BACKGROUND OF THE INVENTION

1. Field of the Invention

The present invention relates to a process of producing calcium aluminate monosulfate hydrate ($3CaO.Al_2O_3.CaSO_4.12H_2O$) (hereinafter, the compound is referred to as MSH in this specification).

2. Description of the Prior Art

It has hitherto been known that MSH is produced by mixing calcium oxide (CaO), alumina ($Al_2O_3$), and calcium sulfate ($CaSO_4$) at a ratio almost same as the mole ratio in $3CaO.Al_2O_3.CaSO_4$, burning the mixture at temperatures of 900°–1450° C. to provide a solid solution of $3CaO.3Al_2O_3.CaSO_4$ (hereinafter, is referred to as $C_4A_3S$), adding thereto predetermined amounts of a lime component, a gypsum component and water, and then subjecting the resulting mixture to a hydration reaction for a long period of time.

However, since the conventional process requires a step of high-temperature burning, the cost of equipment becomes higher and also the amount of energy required for finishing the process becomes larger. Furthermore, the process has such faults that the reaction period of time required is longer and the purity of MSH produced is low as, for example, lower than 50%.

SUMMARY OF THE INVENTION

An object of this invention is, therefore, to provide a novel process for producing MSH useful as building materials without accompanied by the aforesaid faults.

A further object of this invention is to provide a process of producing MSH possessing a high purity at a high yield in a short reaction period of time without need of a high-temperature step.

That is, according to the present invention, there is provided a process of producing MSH by reacting a lime component, an alumina component, and a calcium sulfate component as raw materials together with water at temperatures of from about 100° C. to about 200° C.

DESCRIPTION OF THE PREFERRED EMBODIMENTS

Figure 1:
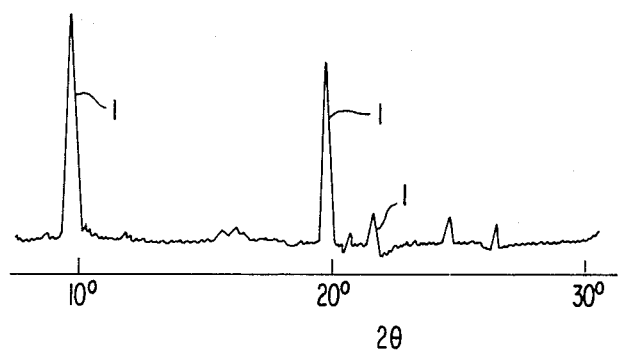
FIG. 1 and FIG. 2 are the X-ray diffraction charts of MSH.

In the process of this invention, a lime component or a CaO component, an alumina component, and a calcium sulfate component are used as the raw materials. As the lime component used in the process of this invention, there are calcium oxide (CaO), calcium hydroxide ($Ca(OH)_2$), and a mixture of them. Also, as the alumina component, there are alumina ($Al_2O_3$), hydrated alumina ($Al_2O_3.n-H_2O$) (wherein $n$ is a positive number), activated alumina, aluminum hydroxide ($Al(OH)_3$), and mixtures of them. In these alumina components, activated alumina, hydrated alumina, and aluminum hydroxide are particularly preferred from a view point of reactivity, in other words, the yield for the product. Furthermore, as the calcium sulfate component, there are anhydrous gypsum ($CaSO_4$), hemihydrate gypsum ($CaSO_4.\frac{1}{2}H_2O$), gypsum dihydrate ($CaSO_4.2H_2O$), and mixtures of them.

There is no particular limitation about the mixing ratio of these raw materials or any desired mixing ratio of these raw materials may be employed in this invention but it is preferred that the raw materials are employed at a mixing ratio near the mole ratio of the components in the composition of MSH. In general, it is preferred that the proportion of the lime component be 2.4–3.3 moles, more preferably about 3 moles, the proportion of the alumina component 0.8–1.0 mole, more preferably about 1 mole calculated as $Al_2O_3$, the proportion of the calcium sulfate component 0.8–1.0 mole, more preferably about 1 mole, and water higher than 12 moles.

At the practice of this invention, the aforesaid mixture is reacted at 100°–200° C., preferably 160°–180° C. under a so-called wet heat condition, that is, under the condition of preventing the escape of a necessary amount of water from the system. If the reaction temperature is higher than 180° C., the tendency of the by-production of $3CaO.Al_2O_3.6H_2O$ (hereinafter, is referred to as $C_3AH_6$) becomes larger while if the temperature is lower than 160° C., the reaction period of time becomes longer a little. In this case, the reaction period of time required at the practice of this invention depends upon the mixing ratio of the raw materials, the reaction temperature, the stirring condition, etc., but is generally about 1–8 hours. For example, if the reaction temperature is about 100° C., a satisfactory result is obtained in about 8 hours, while if the reaction temperature is about 200° C., a satisfactory result is obtained in about one hour. Also since the reaction requires the presence of water and a reaction temperature of higher than 100° C., it is necessary to use an autoclave or a high-pressure vessel for carrying out the process of this invention. The pressure is that water in the reaction system does not escape, that is, the pressure can be desirably selected in the pressure range higher than the saturation vapour pressure at the reaction temperature.

The state of the reaction system at the practice of this invention differs according to the amount of water in the reaction system. If the amount of water is less, that is, the amount of water in the reaction system is about 0.5–1.0 part by weight per part by weight of the solid components in the system, the reaction is carried out in a shaped state or pseudo-solid state while the amount of water is large, that is, the amount of water in the reaction system is about 1.1–5.0 parts by weight per part by weight of the solid components in the system, the reaction is carried out in a slurry state. For producing MSH, it is preferred to carry out the reaction in a slurry state with stirring. On the other hand, for producing MSH as the hardened product (a solid product or a shaped product), it is preferred to carry out the reaction in a shaped state or pseudo-solid state. Also, for carrying out the reaction in a shaped state or pseudo-solid state, it is preferred that the mixing ratio of the raw materials in the reaction system be 3.1–3.3 moles of the lime component, 1.0 mole of the alumina component (as $Al_2O_3$), and 0.9–1.0 mole of the calcium sulfate component. MSH can also be obtained in a powder state from a slurry reaction product by removing water and drying. In addition, it is also preferable to use the raw materials as the powders thereof as fine as possible, and usually satisfactory results are obtained using the raw materials of 100 mesh under. Furthermore, more desired results are obtained by pulverizing the raw materials using a vibration mill, etc., at mixing of them. In addition, these raw materials may be mixed by any order.

In the process of this invention, the purity of MSH produced is higher as the mixing ratio of the raw materials in the reaction system is nearer to the mole ratio of the components in the composition of MSH and in such case MSH having a purity of higher than 98% can be obtained. Therefore, in such case, the purification step for the product is almost unnecessary.

The MSH produced by the process of this invention is useful as a raw material for producing calcium aluminate trisulfate hydrate ($3CaO.Al_2O_3.3CaSO_4.31-32H_2O$). MSH prepared in this invention is also useful as expansive agent for cement. Moreover, MSH can be used as building materials such as ceiling materials, wall materials, flame-retarding materials, etc., as well as electric materials such as insulating plates, etc., by adding thereto additives such as a carbonation preventing agent, a reinforcing agent for fibrous materials, resins, etc., a filler, a pigment, a lubricating agent, etc., followed by hardening.

At the production of the hardened product of MSH, the lime component, the alumina component, the gypsum component, and water are mixed at a predetermined ratio or, if necessary, additives such as fibrous reinforcing agent are added thereto and the composition obtained is, with or without being shaped, cured at 100°-200° C. That is, the composition may be hardened in a bulk state without being shaped into a definite shape and the hardened product may be used as it is or may be formed into a desired form. Or, further, the composition may be shaped into a desired shape before hardening.

The curing condition is almost same as the condition of producing MSH but in the case of carrying out the curing reaction in a solid state, the period of time required for finishing the curing procedure becomes longer so much due to the low heat conductivity. The curing procedure is carried out in such a condition that necessary water of crystallization does not escape from the system. This condition is usually called a wet heat-condition.

The aforesaid additives may be added to the reaction system in any desired step before hardening of MSH. That is, they may be added to the raw materials for MSH prior to the reaction.

Fillers are used for obtaining a caking effect, in particular, for preventing stripping of layers of plate hardened products and examples of fillers used in this invention are, for example, bentonite, kaolin, sericite, etc. Furthermore, for reducing the weight of the hardened product, calcium silicate, etc., may be added to the system as a filler in an amount of lower than 35% by weight of the total amount of the hardened product. Lubricating agents are added for enabling the releasing of the hardened product from a mould, etc., and examples of them are wax, a metal stearate, such as salts of Ca, Zn, Cd, Pb, etc. The amount of the lubricating agent is generally lower than 5% by weight of the hardened product. Examples of fibrous materials are glass fibers, asbestos, etc., and examples of the carbonation preventing agent are a fatty acid such as stearic acid, etc., and derivatives of fatty acids. Furthermore, resins such as polyvinyl alcohol, urea resin, etc., may be used as an effective binder.

Any shaping method may be employed. However, the state of the hardened product after shaping depends upon the amount of water used and the shaping method suitable for the state shall be selected. That is, if the amount of water employed is less, an extrusion molding method or a compression molding method is suitable, while if an amount of water is large and the reaction system is in a slurry state, a pressing method or a casting method is suitable. Furthermore, if the amount of water in a slurry is more larger, it is profitable to shape the reaction system by a paper manufacturing system (wet machine method). In addition, in the case of employing a casting method, it is preferable that the reaction system contains 60-100 parts by weight of water per 100 parts by weight of the solid components and in the case of employing the paper manufacturing method, it is preferable that the reaction system contains 5-20 parts by weight of water per part by weight of the solid components.

The shaped composition is cured at temperatures of 100°-200° C. in the state of preventing the escape of water from the reaction system, or under a wet heat condition. By carrying out the wet heat curing for 1-8 hours, a hardened product is obtained.

If necessary, the hardened product is dried before use. The drying step is carried out at temperatures of the product surface lower than 100° C., preferably lower than 60° C., until water is removed, in general, for 5-8 hours. If the content of water in the composition is large, the drying step is preferably carried out at 60°-100° C. but after the content of water becomes lower, it is preferable to continue the drying step at temperatures lower than 60° C. for preventing the evaporation of water of crystallization to reduce the strength.

The hardened products thus obtained are superior in water resistance and bending strength.

Then, the invention will be explained by the follwoing examples, in which parts and percentages are all by weight.

The bending strength in the examples is the destruction load of the sample per unit cross sectional area when the sample having an optional thickness and a width of 25 mm. is formed into a spun 50 mm.

The temperature of water used in measuring the bending strength and the weight loss is 25° C. unless the temperature is not shown specifically.

The particle sizes of materials which are shown in mesh are measured by the sieve of Tayler (100 mesh = 149 μ of diameter, 325 mesh = 44 μ of diameter).

EXAMPLE 1

A uniform slurry was prepared by adding 168 g. of calcium oxide, 156 g. of aluminum hydroxide, and 172 g. of gypsum dihydrate to 340 g. of water and then the slurry was poured in a mould of 10 mm. × 100 mm. × 200 mm., whereby the slurry was coagurated after 0.5 hours. The coagulation thus formed was reacted in an autoclave for 180 minutes at 180° C. (at 10.2 atm) and then the reaction product was dried for 5 hours at 50° C. to provide a hardened product. The formation of MSH was confirmed by X-ray diffraction. The X-ray diffraction chart of the product is shown in FIG. 1 of the accompanying drawings. The peak in the figure shows the formation of MSH. The yield of MSH was 99.5%. In addition, the MSH obtained was a hardened product and the properties were as follows: That is, the bulk specific density thereof was 1.0, the bending strength was 28 kg./cm.$^2$, and the weight loss thereof when immersed in water for 24 hours was 0.02% by weight.

EXAMPLE 2

Figure 2:
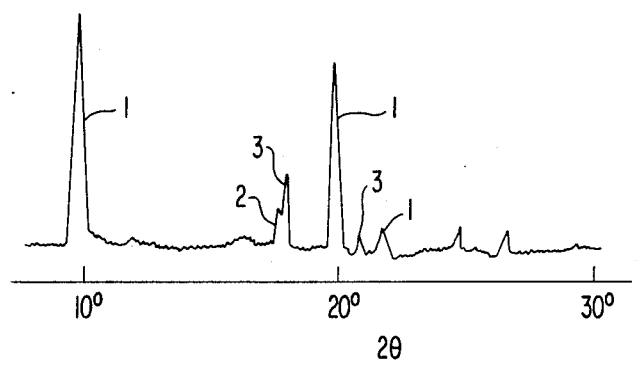

After mixing 200 g. of calcium oxide, 150 g. of activated alumina, and 160 g. of hemihydrate gypsum by milling in a vibration mill for 50 minutes, 400 g. of water was added to the mixture to form an aqueous slurry and the slurry thus formed was coagulated after 0.5 hours in a mould as in Example 1. The coagulated product was reacted in an autoclave for 5 hours at 160° C. and the reaction product was taken out and dried for 5 hours at 50° C. to provide a hardened product of MSH with the yield of 92%. The formation of MSH was confirmed by X-ray diffraction as shown in FIG. 2. In the figure, the peak 3 shows the presence of Al(OH)$_3$. The hardened product had the following properties: That is, the bulk specific density thereof was 1.27, the bending strength was 42 kg./cm.$^2$, and the weight less when immersed in water for 24 hours at 24° C. was 0.41% by weight.

EXAMPLE 3

A mixture prepared by mixing 170 g. of calcium hydroxide, 156 g. of aluminum hydroxide, and 175 g. of gypsum dihydrate for 10 minutes by means of a ribbon mixer, was also mixed with 600 g. of water and the resultant mixture was reacted for 2 hours at 190° C. in a high-pressure reaction vessel, whereby MSH was obtained at a yield of 97.4%. The formation of MSH was confirmed by X-ray diffraction.

While the invention has been described in detail and with reference to specific embodiments thereof, it will be apparent to one skilled in the art that various changes and modifications can be made therein without departing from the spirit and scope thereof.

What is claimed is:

1. A process of producing calcium aluminate monosulfate hydrate which consists essentially of reacting a mixture of a lime component, an alumina component selected from the group consisting of alumina, hydrated alumina, activated alumina, and aluminum hydroxide, a calcium sulfate component, and water at temperatures of 100°–200° C.

2. The process as claimed in claim 1 wherein said lime component is at least one member selected from the group consisting of calcium oxide and calcium hydroxide.

3. The process as claimed in claim 1 wherein said alumina component is activated alumina.

4. The process as claimed in claim 1 wherein said alumina component is hydrated alumina.

5. The process as claimed in claim 1 wherein said alumina component is aluminum hydroxide.

6. The process as claimed in claim 1 wherein said calcium sulfate component is at least one member selected from the group consisting of anhydrous gypsum, hemihydrate gypsum, and gypsum dihydrate.

7. The process as claimed in claim 1 wherein the mixing ratio of said lime component, alumina component, calcium sulfate component, and water is 2.4–3.3 : 0.8–1.0 (calculated as Al$_2$O$_3$) : 0.8–1.0 : at least 12 by mole ratio.

8. The process as claimed in claim 7 wherein said mixing ratio is 3 : 1 : 1 : at least 12 by mole ratio.

9. The process as claimed in claim 1 wherein the reaction temperature is 160°–180° C.

10. The process as claimed in claim 1 wherein the reaction is carried out while preventing the escape of water from the reaction system.

11. The process as claimed in claim 1 wherein the mixing ratio of the lime component, alumina component, and calcium sulfate component is 3.1–3.3 : 1 (calculated as Al$_2$O$_3$) : 0.9–1.0 by mole ratio, the amount of water in the reaction system is more than the amount necessary for forming calcium aluminate monosulfate hydrate, and the reaction product is produced as a hardened product.

* * * * *